United States Patent
Inose et al.

(10) Patent No.: US 11,987,034 B2
(45) Date of Patent: May 21, 2024

(54) METAL-RESIN JOINING METHOD

(71) Applicant: IHI Corporation, Tokyo (JP)

(72) Inventors: Koutarou Inose, Tokyo (JP); Naoyuki Matsumoto, Tokyo (JP); Daiki Okita, Tokyo (JP); Kenshiro Kimura, Tokyo (JP); Hiroto Yamaoka, Tokyo (JP)

(73) Assignee: IHI Corporation, Tokyo (JP)

( * ) Notice: Subject to any disclaimer, the term of this patent is extended or adjusted under 35 U.S.C. 154(b) by 316 days.

(21) Appl. No.: 17/448,553

(22) Filed: Sep. 23, 2021

(65) Prior Publication Data
US 2022/0009216 A1    Jan. 13, 2022

Related U.S. Application Data

(63) Continuation of application No. PCT/JP2019/013962, filed on Mar. 29, 2019.

(51) Int. Cl.
*B32B 37/12* (2006.01)
*B32B 38/00* (2006.01)

(52) U.S. Cl.
CPC .. *B32B 37/1207* (2013.01); *B32B 2038/0076* (2013.01)

(58) Field of Classification Search
CPC ........ B32B 37/1207; B32B 2038/0076; B29C 66/72; B29C 66/7428; B29C 66/7422; B29C 65/7832

(Continued)

(56) References Cited

U.S. PATENT DOCUMENTS

2004/0089638 A1   5/2004   Tanaka
2006/0266471 A1   11/2006  Tanaka
(Continued)

FOREIGN PATENT DOCUMENTS

CN   107428090 A   12/2017
JP   03-150155 A   6/1991
(Continued)

OTHER PUBLICATIONS

International Search Report dated Jul. 2, 2019 in PCT/JP2019/013962 filed on Mar. 29, 2019, citing documents AA-AB & AJ-AN therein, 2 pages.

(Continued)

*Primary Examiner* — S. Behrooz Ghorishi
*Assistant Examiner* — Gregory C. Grosso
(74) *Attorney, Agent, or Firm* — Oblon, McClelland, Maier & Neustadt, L.L.P.

(57) ABSTRACT

A metal-resin joining method of joining a metal member to a composite material member including a fiber reinforced plastic composite material includes an applying step of applying a first adhesive that is a thermosetting adhesive to a first region between the metal member and the composite material member, and applying a second adhesive that is a thermosetting adhesive to a second region between the metal member and the composite material member, a provisional bonding step of irradiating a first irradiation region of the metal member opposed to the first region with a laser light, and heating and curing the first adhesive to provisionally bond the metal member and the composite material member together, and a main bonding step of curing the second adhesive after the provisional bonding step to bond the metal member and the composite material member together.

8 Claims, 8 Drawing Sheets

(58) Field of Classification Search
 USPC .................................................. 156/275.7
 See application file for complete search history.

(56) References Cited

U.S. PATENT DOCUMENTS

| | | | |
|---|---|---|---|
| 2008/0115888 A1 | 5/2008 | Husemann et al. | |
| 2018/0086005 A1 | 3/2018 | Yasuyama et al. | |
| 2018/0111326 A1* | 4/2018 | Muir | B32B 15/14 |
| 2021/0107269 A1 | 4/2021 | Takahashi et al. | |
| 2021/0129488 A1 | 5/2021 | Takahashi et al. | |

FOREIGN PATENT DOCUMENTS

| | | | |
|---|---|---|---|
| JP | 2004-154836 A | 6/2004 | |
| JP | 2008-213156 A | 9/2008 | |
| JP | 2009-241569 A | 10/2009 | |
| JP | 2013-173248 A | 9/2013 | |
| JP | 2014-076545 A | 5/2014 | |
| JP | 5523260 B2 | 6/2014 | |
| JP | 2018-167418 A | 11/2018 | |
| JP | 2019-069534 A | 5/2019 | |
| TW | 200902668 A | 1/2009 | |
| WO | WO-2013166499 A2 * | 11/2013 | ............... C09J 5/06 |
| WO | WO 2017/090245 A1 | 6/2017 | |
| WO | WO 2018/124215 A1 | 7/2018 | |

OTHER PUBLICATIONS

Taiwanese Office Action dated May 19, 2020 in Taiwanese Application No. 108111256, citing documents AU-AV therein, 4 pages.
Extended European Search Report dated Nov. 9, 2022 in European Patent Application No. 19922973.3, citing reference 1 therein, 9 pages.

* cited by examiner

METAL-RESIN JOINING METHOD

CROSS REFERENCE TO RELATED APPLICATIONS

This application is a continuation application of International Application No. PCT/JP2019/013962, filed on Mar. 29, 2019, the entire contents of which are incorporated by reference herein.

BACKGROUND

1. Technical Field

The present disclosure relates to a metal-resin joining method.

2. Description of the Related Art

Pillar structure bodies formed from metallic material such as steel material are typically used for structures such as marine superstructures, bridges, carriers, and industrial machines. To achieve a reduction in weight of the structure bodies, a technique is known that uses fiber reinforced plastic (FRP) composite material lighter than steel material for part of the structure bodies to be formed. JP 2008-213156 (Patent Literature 1) discloses a technique regarding a structure body in which a metal member formed from metallic material and a composite material member formed from FRP are joined together.

SUMMARY

When at least either the metal member or the composite material member has a large size, for example, it is hard to align the metal member with the composite material member accurately at an intended joined position at the first try. If the joined position is displaced from the intended position after the first joint, the respective members need to be separated once and aligned with each other again so as to be joined together. Since the joining technique disclosed in 2008-213156 heats and melts a part of the composite material member with a laser light so as to join the part with the metal member, a large change is inevitably caused particularly in the state of the composite material member only with the single joint processing. The joining technique disclosed in 2008-213156 thus still needs to be improved if applied to the case in which the joint processing is expected to be repeated several times as described above.

An object of the present disclosure is to provide a metal-resin joining method contributing to facilitating a process of joining a metal member and a composite material member together, for example.

An aspect of the present disclosure provides a metal-resin joining method of joining a metal member to a composite material member including a fiber reinforced plastic composite material, the method including an applying step of applying a first adhesive that is a thermosetting adhesive to a first region between the metal member and the composite material member, and applying a second adhesive that is a thermosetting adhesive to a second region between the metal member and the composite material member, a provisional bonding step of irradiating a first irradiation region of the metal member opposed to the first region with a laser light, and heating and curing the first adhesive to provisionally bond the metal member and the composite material member together, and a main bonding step of curing the second adhesive to bond the metal member and the composite material member together after the provisional bonding step.

The metal-resin joining method further includes a temporary bonding step of irradiating the first irradiation region or a second irradiation region of the metal member opposed to the second region with the laser light, and heating and curing the first adhesive or the second adhesive to temporarily bond the metal member and the composite material member together before the provisional bonding step. The provisional bonding step may separate the metal member from the composite material member when a joined position between the metal member and the composite material member is displaced after the temporary bonding step, so as to execute provisional bonding after aligning the respective members with each other. The main bonding step may irradiate a second irradiation region opposed to the second region with the laser light, so as to heat and cure the second adhesive. The provisional bonding step and the main bonding step may differ in at least one of a type, a heating temperature, and a heating time of the first adhesive and the second adhesive. The first adhesive may differ in the heating time from the second adhesive when the first adhesive and the second adhesive are the same type. The first adhesive may differ in the heating temperature from the second adhesive when the first adhesive differs in the type from the second adhesive. The second adhesive can be cured by normal temperature curing, and the main bonding step may cure the second adhesive by the normal temperature curing. The main bonding step may separate the metal member from the composite material member when a joined position between the metal member and the composite material member is displaced after the provisional bonding step, so as to execute main bonding after aligning the respective members with each other. The first region and the second region may be defined on a joined surface between the metal member and the composite material member in accordance with a degree of a shear stress applied in a direction parallel to the joined surface.

DESCRIPTION OF THE EMBODIMENTS

Figure 1:
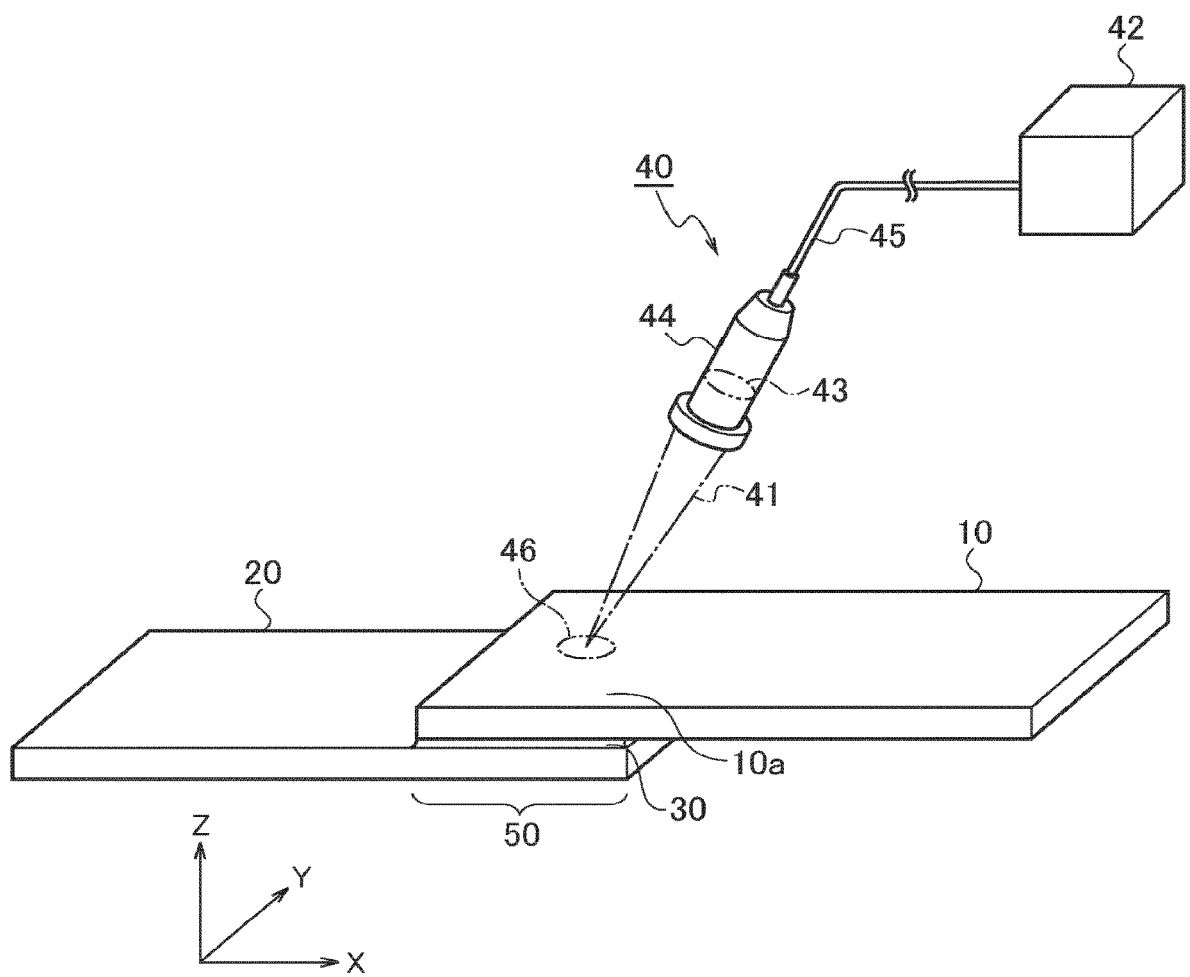
FIG. 1 is a view showing a joined target and a configuration of a laser heating device according to an embodiment of the present disclosure.

Embodiments of the present disclosure will be described in detail below with reference to the drawings. The following dimensions, materials, and other specific numerical values described in the respective embodiments are shown for illustration purposes, and the present disclosure is not intended to be limited thereto unless otherwise specified. The elements having substantially the same functions and structures are denoted by the same reference numerals, and overlapping explanations are not repeated below. The elements described below but not related directly to the present disclosure are not shown in the drawings. In the following explanations of the drawings, a vertical direction is defined as a Z-axis, a direction perpendicular to the Z-axis on a horizontal plane is defined as an X-axis, and a direction perpendicular to the X-axis on the horizontal plane is defined as a Y-axis.

A metal-resin joining method according to the present embodiment joins a metal member formed from metallic material to a composite material member formed from fiber reinforced plastic (FRP) composite material by bonding with a thermosetting adhesive. A joined body of the metal member and the composite material member joined by the joining method can be used as a pillar structure body or a beam structure body for a structure such as a marine superstructure, a bridge, a carrier, and an industrial machine. The structure body of this type partly includes the FRP, and thus has the advantage of having a lighter weight than other bodies entirely formed from metal.

FIG. 1 is a perspective view illustrating the metal member 10 and the composite material member 20 as a joined target and a configuration of a laser heating device 40 used for the metal-resin joining method according to the present embodiment. The metal member 10 and the composite material member 20 are each presumed to be a flat plate member in which the longitudinal direction corresponds to the X direction, for example. The metal member 10 and the composite material member 20 are also presumed to be joined together partly on the respective main flat surfaces. A joined body of the metal member 10 and the composite material member 20 serves as a lap joint.

The metal member 10 is formed from steel material such as carbon steel or stainless steel. The metal member 10 can be formed by mechanical processing used for typical steel material. The material used for the metal member 10 is not limited to the steel material (an iron-based alloy), and any other metallic material may also be used such as aluminum material (such as an aluminum alloy), titanium material (such as a titanium alloy), and nickel material (such as a nickel alloy).

The composite material member 20 is formed from fiber reinforced plastic composite material including reinforcing fibers and matrix fibers. Examples of reinforcing fibers to be used include carbon fibers, organic fibers such as aramid fibers, and glass fibers. Examples of matrix fibers to be used include thermosetting resin such as epoxy resin, polyimide rein, polyester resin, phenol resin, vinyl ester resin, and thermoplastic resin. The composite material member 20 can be molded by a molding method used for typical fiber reinforced plastic composite material. The molding method to be applied may be a method of stacking prepregs and then subjecting to resin curing with an autoclave, for example. Alternatively, a resin transfer molding (RTM) method may also be applied that puts a preform formed from fabric to a metal die and cures the preform after being impregnated with resin.

A thermosetting adhesive 30 to be used includes synthetic resin such as epoxy resin, and has the characteristics not cross-linked before being heated. The thermosetting adhesive 30 is not only an adhesive in which the cross-linking is promoted by heating, but also an adhesive that is cross-linked by normal temperature curing.

The laser heating device 40 irradiates, with a laser light 41, a surface 10a of the metal member 10 covering a joined part 50 when at least part of the metal member 10 and at least part of the composite material member 20 are stacked together with the thermosetting adhesive 30 interposed therebetween. When the metal member 10 is heated by the irradiation with the laser light 41, the thermosetting adhesive 30 is heated by the heat transferred through the metal material 10.

The laser heating device 40 includes, for example, a laser oscillator 42 that oscillates the laser light 41, a laser torch 44 equipped with a condensing optical system 43 therein, and an optical fiber 45 that leads the laser light 41 oscillated from the laser oscillator 42 to the laser torch 44. The laser light 41 as used herein may be any type that can heat the thermosetting adhesive 30 to a degree sufficient to cure, namely, can sufficiently heat the surface 10A of the metal member 10. For example, the laser light 41 to be used may be a semiconductor laser having a wavelength of 880 nm. FIG. 1 illustrates a case of using a just-focus beam as the laser light 41 focused on an irradiation region 46. The laser light 41 may be a defocused beam not focused on the irradiation region 46 instead.

The laser heating device 40 can set the irradiation region 46 of the laser light 41 to any part on the surface 10a of the metal member 10. The laser heating device 40 may move the laser torch 44 in parallel to the surface 10a of the metal member 10 so as to change the irradiation region 46, or may change the direction of the laser torch 44 so as to change the irradiation region 46.

Figure 2:
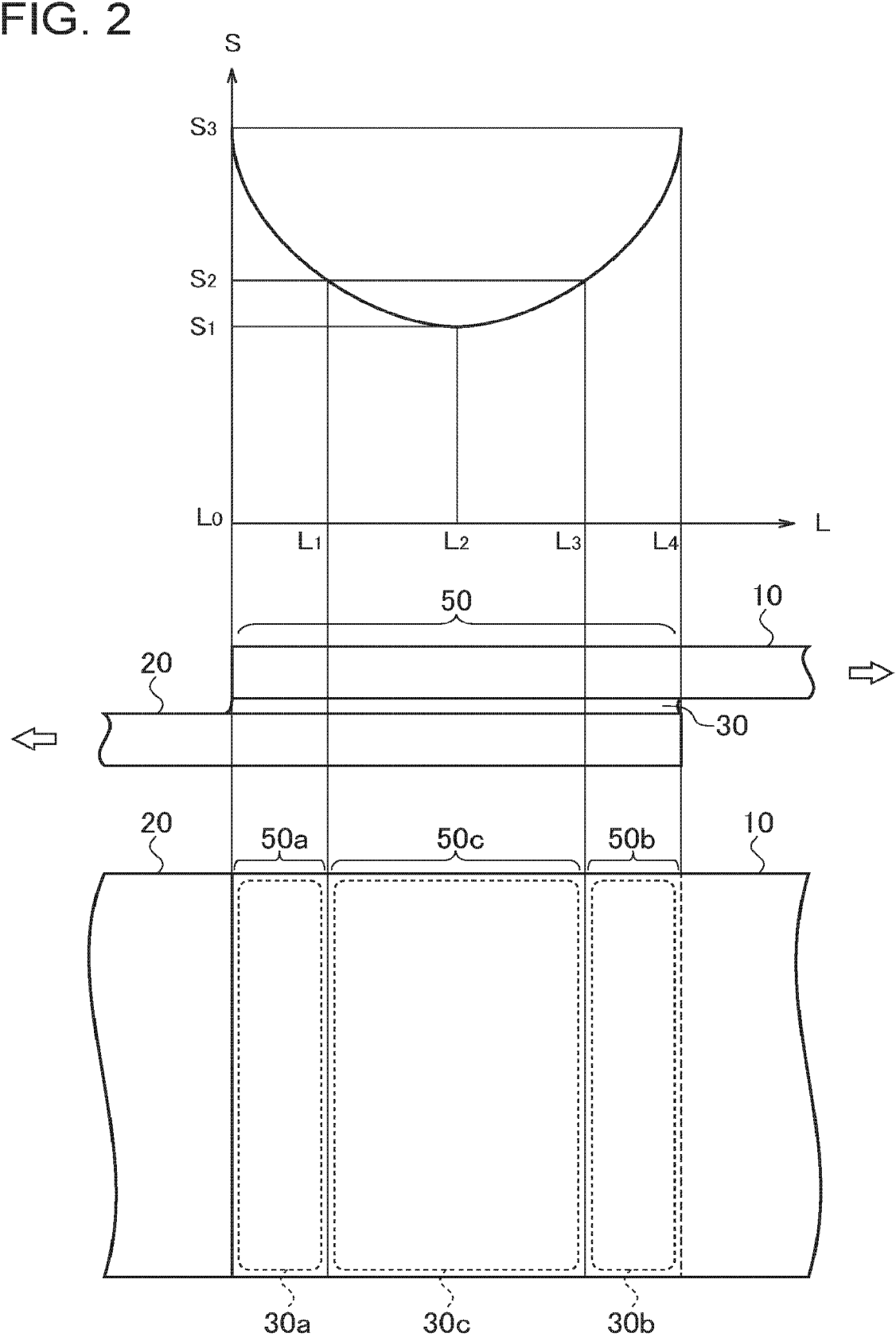
FIG. 2 is a view for explaining an applied position of a thermosetting adhesive.

An applied position of the thermosetting adhesive 30 is described below. FIG. 2 is a composite diagram for explaining the applied position of the thermosetting adhesive 30.

The view at the intermediate level in FIG. 2 is a side view illustrating the joined part 50 at which the metal member 10 and the composite material member 20 are joined together by bonding with the thermosetting adhesive 30. The intermediate-level view illustrates a state in which the thermosetting adhesive 30 is applied to the entire region in which the metal member 10 and the composite material member 20 are opposed to each other, and the curing has been completed. As indicated by the solid-white arrows in FIG. 2, a tensile load is presumed to be applied to the metal member 10 and the composite material member 20 in the direction parallel to the joined surface.

The view at the upper level in FIG. 2 is a graph showing a distribution of tensile and shear stress on the joined surface in the tensile direction that can be caused when the tensile load is applied as described above. The axis of abscissas in the upper-level view shows a distance L in the joined part 50 in the tensile direction on the basis of the edge of the metal member 10. The position at the distance $L_0$ corresponds to the edge of the joined part 50 on the metal member 10 side, and the position at the distance $L_4$ corresponds to the edge of the joined part 50 on the composite material member 20 side. The axis of ordinates in the upper-level view shows a shear stress S. The distribution of the shear stress S in the tensile direction indicates a curve having an apex at the distance $L_2$ that is the intermediate position between the edge on the metal member 10 side and the edge on the composite material member 20 side, and having the maximum points at the respective edges.

The following is a case presumed in which the thermosetting adhesive 30 is applied only to a particular part in the joined part 50 so that the metal member 10 and the composite material member 20 are provisionally bonded to be aligned with each other. A larger value of the shear stress S may lead to a higher possibility of causing a displacement from the joined position between the metal member 10 and the composite metal member 20. To avoid the displacement, the application of the thermosetting adhesive 30 used for the provisional bonding to a region with the large shear stress S is more effective than the application to a region with the small shear stress S in the joined part 50.

The view at the lower level in FIG. 2 is a plan view defining two first regions 50a and 50b presumed to have a large value of the shear stress S and a second region 50c presumed to have a smaller value of the shear stress S than the first regions 50a and 50b. The first region 50a is located closer to the edge of the joined part 50 on the metal member 10 side, in particular, corresponds to a region between the position at the distance $L_0$ and the position at the distance $L_1$ in the upper-level view. The first region 50b is located closer to the edge of the joined part 50 on the composite material member 20 side, in particular, corresponds to a region between the position at the distance $L_3$ and the position at the distance $L_4$ in the upper-level view. The shear stress $S_2$ at each of the distance $L_1$ and the distance $L_3$ is greater than the shear stress $S_1$ at the distance $L_2$, and is smaller than the shear stress $S_3$ at each of the distance $L_0$ and the distance $L_4$. The distance $L_1$ and the distance $L_3$ are particularly determined depending on the degree of the shear stress S and its allowance.

Figure 3A:
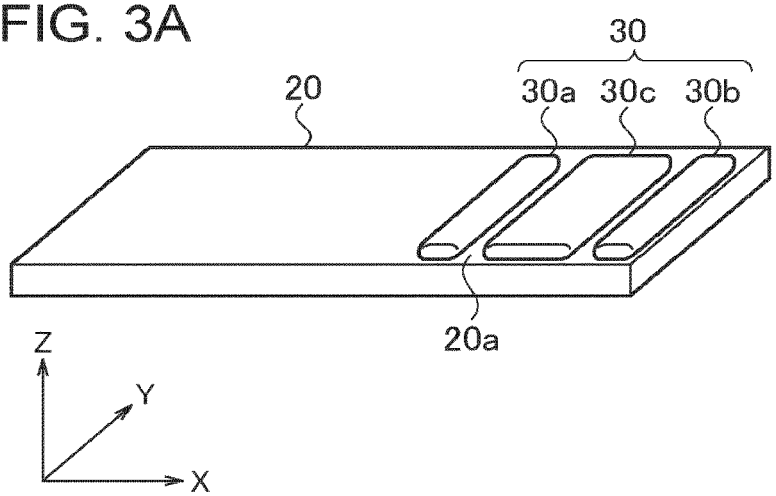
FIG. 3A is a view for explaining an applying step according to the embodiment of the present disclosure.
Figure 3B:
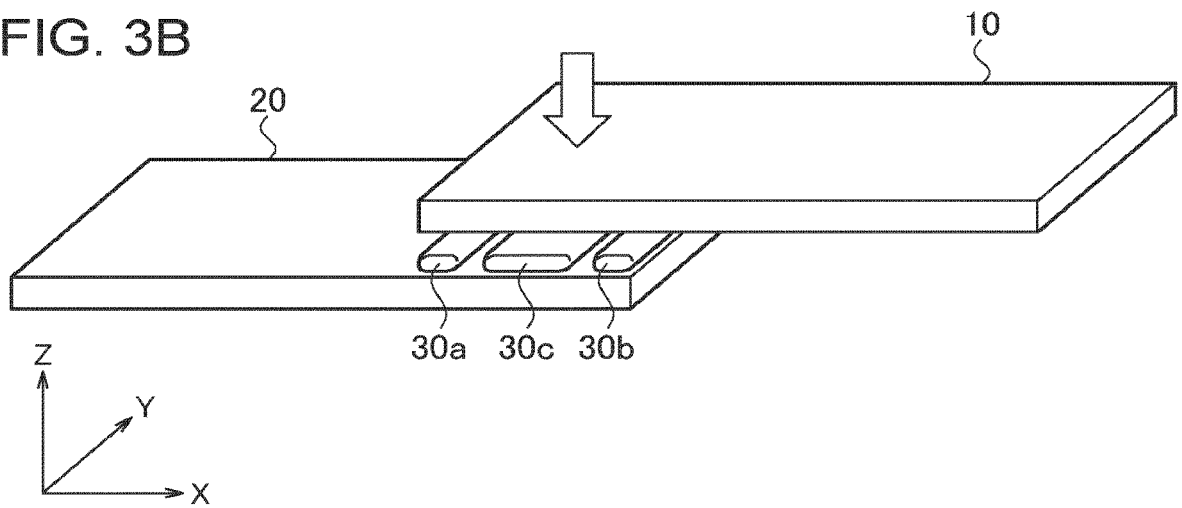
FIG. 3B is a view for explaining a first stacking step included in a temporary bonding step according to the embodiment of the present disclosure.
Figure 3C:
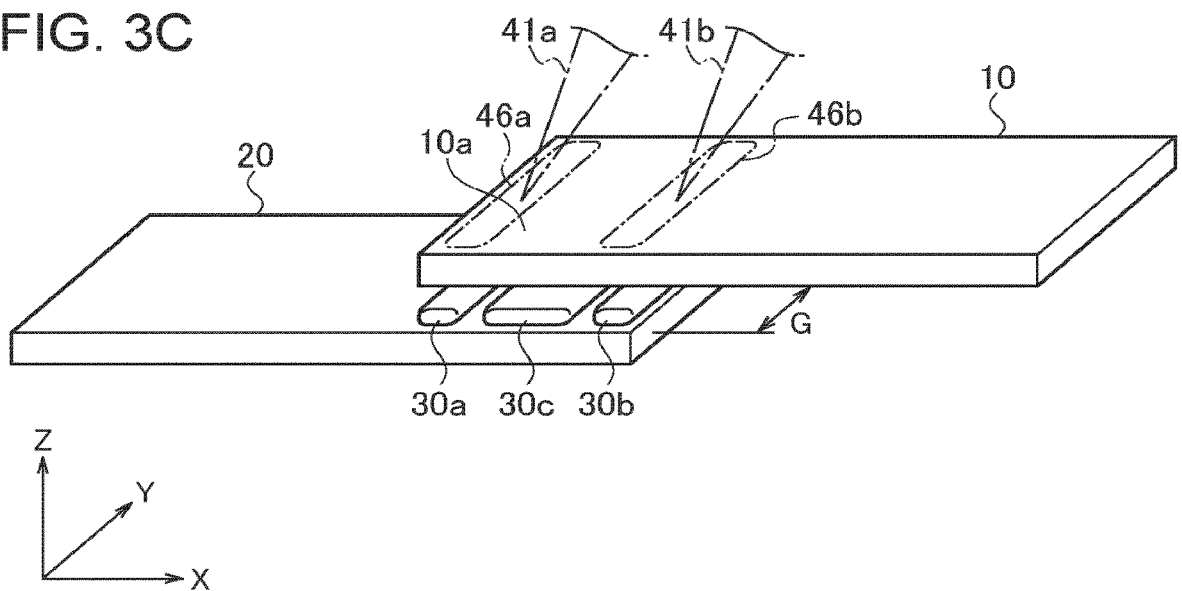
FIG. 3C is a view for explaining a first irradiating step included in the temporary bonding step according to the embodiment of the present disclosure.

Next, a specific process of the metal-resin joining method according to the present embodiment is described below. FIG. 3A to FIG. 3C are perspective views for explaining the respective steps from an applying step to a temporary bonding step using the thermosetting adhesive 30 included in the metal-resin joining method.

FIG. 3A is a view for explaining the applying step of applying the thermosetting adhesive 30. The applying step applies the thermosetting adhesive 30 to a surface 20a of the composite material member 20 corresponding to the joined part 50. The present embodiment can vary the type of the thermosetting adhesive 30 to be used depending on the first regions 50a and 50b and the second region 50c defined in accordance with the value of the shear stress S. The thermosetting adhesive 30 applied to the surface 20a corresponding to the first region 50a illustrated in the lower-level view in FIG. 2 is indicated by a first adhesive 30a. Similarly, the thermosetting adhesive 30 applied to the surface 20a corresponding to the first region 50b is indicated by a first adhesive 30b. The thermosetting adhesive 30 applied to the surface 20a corresponding to the second region 50c is indicated by a second adhesive 30c. The type or the combination of the first adhesives 30a and 30b and the second adhesive 30c is described in detail below. The temporary bonding step is executed after the applying step of applying the thermosetting adhesive 30.

The temporary bonding step is a step of heating and curing at least part of the first adhesives 30a and 30b or the second adhesive 30c applied in the applying step so as to temporarily bond the metal member 10 and the composite material member 20 together. The temporary bonding step includes a first stacking step and a first irradiating step, for example.

FIG. 3B is a view for explaining the first stacking step. The first stacking step brings at least part of the metal member 10 into contact with the thermosetting adhesive 30 applied on the surface 20a of the composite material member 20 so as to lead the metal member 10 and the composite material member 20 to be stacked together. The metal member 10 at this point can be still moved with respect to the composite material member 20, since the thermosetting adhesive 30 is not immediately cured. The first irradiating step is executed after the first stacking step.

FIG. 3C is a view for explaining the first irradiating step. The first irradiating step leads the laser heating device 40 to irradiate the surface 10a of the metal member 10 with the laser light 41. The irradiation region 46 corresponds to a region in which the adhesive intended to be cured is present, since the first irradiating step heats and cures at least part of the first adhesives 30a and 30b or the second adhesive 30c. The following is an example presumed in which at least part of the first adhesives 30a and 30b present in the first regions 50a and 50b is cured.

The laser heating device 40 in this case irradiates a first irradiation region 46a corresponding to the first region 50a with the laser light 41a. Similarly, the laser heating device 40 irradiates a first irradiation region 46b corresponding to the first region 50b with the laser light 41b. This irradiation heats the first irradiation regions 46a and 46b. The heat applied is transferred to the first adhesive 30a closest to the first irradiation region 46a and the first adhesive 30b closest to the first irradiation region 46b through the inside of the metal member 10. The first adhesives 30a and 30b are then mainly cured, while the second adhesive 30c away from the irradiation region 46 is merely cured. The metal member 10 and the composite material member 20 at the point in which the first irradiating step has been finished are thus temporarily bonded together via part of the thermosetting adhesive 30, namely, via the first adhesives 30a and 30b. The phrase "the metal member 10 and the composite material member 20 are temporarily bonded together via the part of the thermosetting adhesive 30" encompasses a state in which the heating time and the temperature of the first adhesives 30a and 30b upon the laser irradiation are decreased so that the first adhesives 30a and 30b are both semi-cured. The phrase "the metal member 10 and the composite material member 20 are temporarily bonded together via the part of the thermosetting adhesive 30" also encompasses a state in which at least part of each of the first adhesives 30a and 30b is only heated and cured.

The first irradiating step is executed immediately after the first execution of the first stacking step. The positioning of the metal member 10 at an intended position on the composite material member 20 is not hard to execute when the metal member 10 has a small size, for example. The positioning of the metal member 10 at the intended position on the composite material member 20 is, however, not easy to execute in the first stacking step if the metal member 10 has a large size. FIG. 3C illustrates a case presumed, for illustration purposes, in which the metal member 10 is stacked on the composite material member 20 but is determined to be displaced from the intended position, while being temporarily bonded together having a displaced amount G caused in the Y direction. The displaced amount G is shown in the drawing in an exaggerated manner for brevity. A provisional bonding step is executed after the temporary bonding step.

The provisional bonding step is a step of provisionally bonding the metal member 10 and the composite material member 20 together after being aligned again so as to be located at the intended joined position. The term "provisional bonding" refers to a bonded state in which the metal member 10 and the composite material member 20 are bonded to a degree sufficient to avoid the displacement from each other. The provisional bonding step includes a separating step, a second stacking step, and a second irradiating step, for example.

Figure 4A:
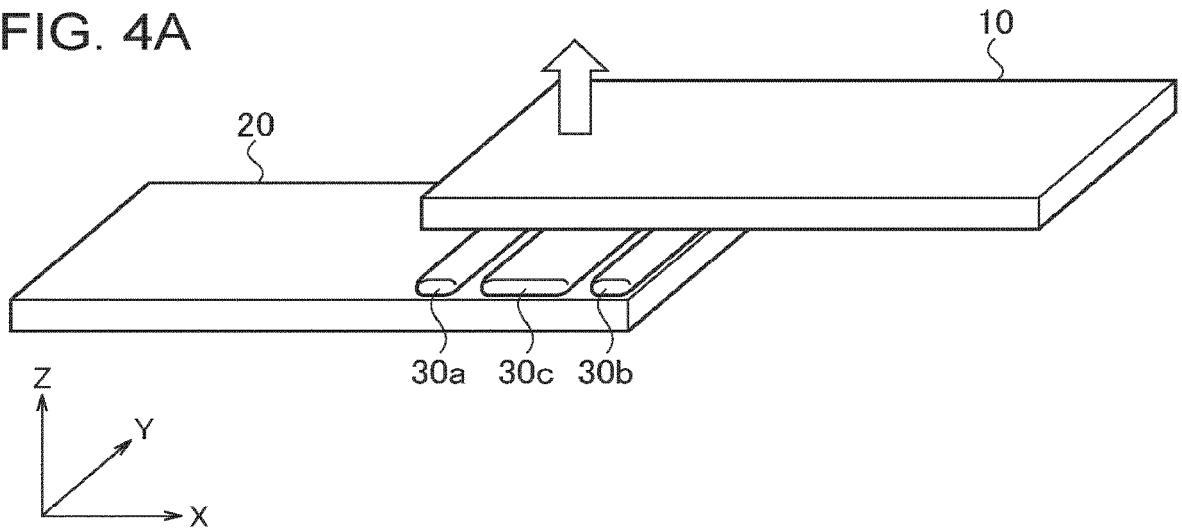
FIG. 4A is a view for explaining a separating step included in a provisional bonding step according to the embodiment of the present disclosure.
Figure 4B:
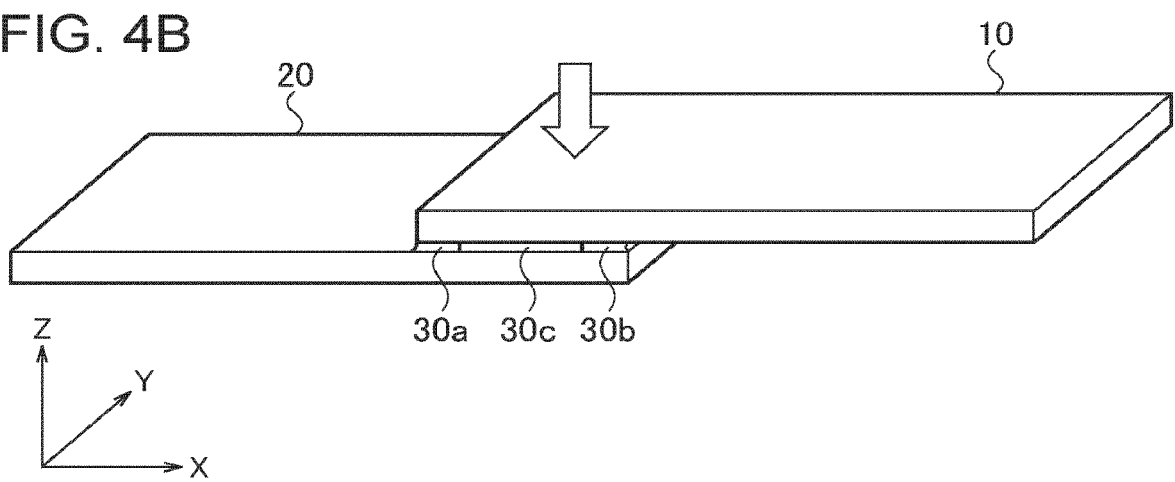
FIG. 4B is a view for explaining a second stacking step included in the provisional bonding step according to the embodiment of the present disclosure.
Figure 4C:
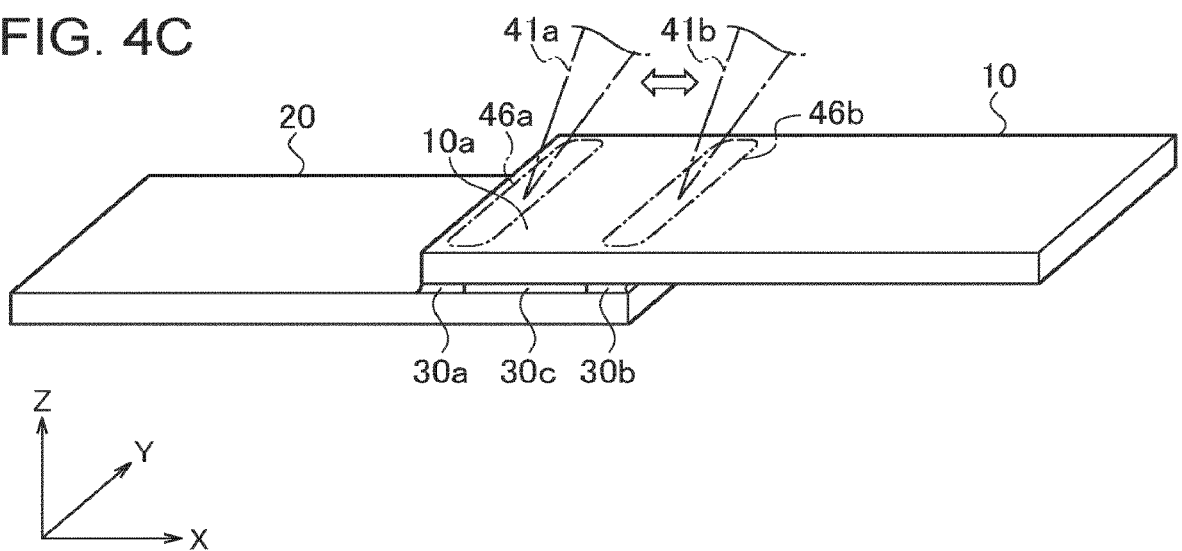
FIG. 4C is a view for explaining a second irradiating step included in the provisional bonding step according to the embodiment of the present disclosure.

FIG. 4A to FIG. 4C are perspective views for explaining the provisional bonding step included in the metal-resin joining method.

FIG. 4A is a view for explaining the separating step. The separating step temporarily separates the metal member 10 from the composite material member 20 in the temporary bonded state so as to correct the displaced amount G. The temporary bonded state is illustrated above with the case in which the metal member 10 and the composite material member 20 are bonded together only by use of at least part of the first adhesives 30a and 30b. The operator in this case thus can easily separate the metal member 10 as compared with a case in which the metal member 10 and the composite material member 20 are bonded together with the thermosetting adhesive 30 applied to the entire joined surface in the joined part 50. The second stacking step is executed after the separating step.

FIG. 4B is a view for explaining the second stacking step. The second stacking step stacks the metal member 10 and the composite material member 20 together, as in the case of the first stacking step, while aligning the metal member 10 with the composite material member 20 so as to be shifted to the intended position from the state in which the displaced amount G is caused. The first adhesives 30a and 30b have been cured in the previous first irradiating step. The position of the metal member 10 aligned with the composite material member 20 thus can be kept to some extent also in this second stacking step. The execution of each of the previous separating step and the second stacking step is not limited to one time, and may be repeated several times until the metal member 10 is stacked on the composite material member 20 at the intended position. The second irradiating step is executed after the metal member 10 is stacked on the composite material member 20 at the intended position as described above.

FIG. 4C is a view for explaining the second irradiating step. The second irradiating step leads the laser heating device 40 to irradiate the surface 10a of the metal member 10 with the laser light 41. The first irradiating step is illustrated above with the case of curing at least part of the first adhesives 30a and 30b in the first regions 50a and 50b by the irradiation with the laser light 41. The second irradiating step included in the provisional bonding step entirely cures the first adhesives 30a and 30b.

In particular, the laser heating device 40 irradiates the entire first irradiation region 46a with the laser light 41a.

Similarly, the laser heating device 40 irradiates the entire first irradiation region 46b with the laser light 41b. The order of irradiation of the respective first irradiation regions 46a and 46b with the laser light 41 is determined as appropriate. When the laser heating device 40 includes the plural laser torches 44, the first irradiation regions 46a and 46b may be irradiated simultaneously with the laser light 41.

The second irradiating step heats the entire first irradiation regions 46a and 46b with the laser lights 41a and 41b. The heat applied is transferred to the first adhesive 30a closest to the first irradiation region 46a and the first adhesive 30b closest to the first irradiation region 46b through the inside of the metal member 10. The first adhesives 30a and 30b are then mainly cured, while the second adhesive 30c away from the first irradiation regions 46a and 46b is merely cured. The metal member 10 and the composite material member 20 at the point in which the second irradiating step has been finished are thus temporarily bonded together via part of the thermosetting adhesive 30, namely, via the first adhesives 30a and 30b. A main bonding step is executed after the provisional bonding step.

The temporary bonding step and the provisional bonding step are illustrated above with the case of determining whether the displaced amount G is caused upon the joint between the metal member 10 and the composite material member 20, and executing the provisional bonding after the completion of the alignment including the separating step when the displaced amount G is caused. The respective members can be joined together without the displaced amount G caused in the original bonding step when the metal member 10 has a small size, for example, since it is easy to align the metal member 10 with the composite material member 20 at the intended position. The temporary bonding step described above may be omitted when the displaced amount G can be preliminarily presumed to be avoided depending on the conditions such as the size of the metal member 10. The second stacking step and the second irradiating step in the provisional bonding step in this case are presumed to correspond to the step of boning the metal member 10 with the composite material member 20 first.

The main bonding step is a step of curing the part of the thermosetting adhesive 30 not cured yet so as to completely bond the metal member 10 and the composite material member 20 together. The term "main bonding" refers to a bonded state in which the joined body of the metal member 10 and the composite material member 20 manufactured by the above steps has strength and rigidity that fulfill predetermined values with respect to a designed load. The main bonding step as used herein can include the following steps.

As a first main bonding step, a third irradiating step may be used that heats and cures part of the adhesive in the non-cured state by the irradiation with the laser light 41, as in the case of the first irradiating step and the second irradiating step.

Figure 5:
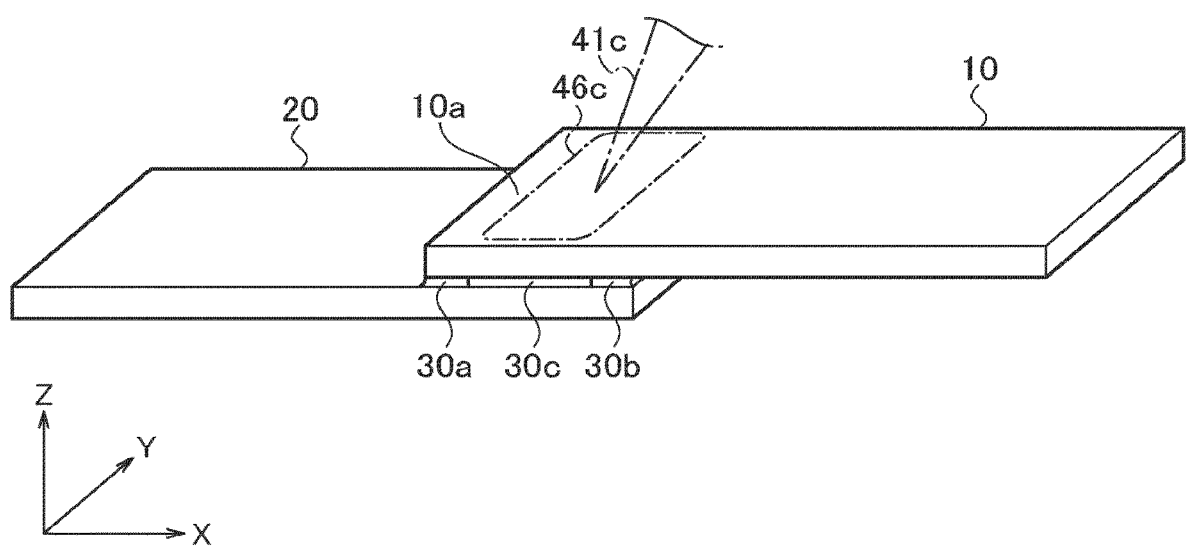
FIG. 5 is a view for explaining a main bonding step according to the embodiment of the present disclosure.

FIG. 5 is a view for explaining the third irradiating step. The third irradiating step leads the laser heating device 40 to irradiate the surface 10a of the metal member 10 with the laser light 41, as in the case of the first irradiating step. The irradiation region 46 on the surface 10a in the third irradiating step is a region corresponding to at least the second region 50c. In particular, the laser heating device 40 irradiates a second irradiation region 46c corresponding to the second region 50c with the laser light 41c.

The third irradiating step heats the second irradiation region 46c with the laser light 41c. The heat applied is transferred to the second adhesive 30c closest to the second irradiation region 46c through the inside of the metal member 10. The second adhesive 30c is thus cured so that the metal member 10 and the composite material member 20 are led to a main bonded state due to the curing of the thermosetting adhesive 30 present in the entire joined surface including the first adhesives 30a and 30b.

As a second main bonding step, the adhesive in the non-cured state may be hardened by normal temperature curing, instead of being hardened by heating, when the thermosetting adhesive 30 to be used can be hardened by the normal temperature curing. The normal temperature curing made for the second adhesive 30c can harden all of the thermosetting adhesive 30 present in the entire joined surface including the first adhesives 30a and 30b so as to lead the metal member 10 and the composite material member 20 to the main bonded state.

When the joined body has a small size, for example, a third main bonding step may be used that places and heats the joined body in a heating furnace after the provisional bonding step so as to cure the second adhesive 30c. The curing of the second adhesive 30c by use of the heating furnace can harden all of the thermosetting adhesive 30 present in the entire joined surface including the first adhesives 30a and 30b so as to lead the metal member 10 and the composite material member 20 to the main bonded state.

The displaced amount G could be still caused at the point in which the provisional bonding step has been finished. In such a case, the step similar to the provisional bonding step may be repeated before the execution of the main bonding step.

Next, the joining conditions in the first irradiating step, the second irradiating step, and the third irradiating step are described below. The present embodiment includes the three irradiating steps for curing the thermosetting adhesive 30 by the laser irradiation including the third irradiating step as the main bonding step. The second irradiating step particularly relates to the provisional bonding between the metal member 10 and the composite material member 20. The third irradiating step relates to the main bonding between the metal member 10 and the composite material member 20. The bonding conditions can be defined as follows so as to meet the respective characteristics of the provisional bonding and the main bonding.

FIG. 3A to FIG. 5 illustrate the case in which the first adhesives 30a and 30b and the second adhesive 30c are used for the first regions 50a and 50b and the second region 50c respectively. The present embodiment is presumed to vary the bonding conditions in the second irradiating step and the third irradiating step depending on the determination of whether the type of the first adhesives 30a and 30b used for the first regions 50a and 50b is the same as or different from the type of the second adhesive 30c used for the second region 50c.

First, the first adhesives 30a and 30b and the second adhesive 30c of the thermosetting adhesive 30 are presumed to be the same type. The curing temperature is the same when the same type of the thermosetting adhesive is used. A laser output of the laser heating device 40 is then adjusted so that the first adhesives 30a and 30b are heated in the second irradiating step at the same temperature as the second adhesive 30c heated in the third irradiating step. In this case, the second irradiating step and the third irradiating step differ from each other in the heating time when heating the thermosetting adhesive 30 by the laser irradiation. Since the second irradiating step particularly executes the provisional bonding, only the first irradiation regions 46a and 46b corresponding to the first regions 50a and 50b need to be irradiated with the laser light 41. The present embodiment is illustrated with the case in which the first irradiation regions 46a and 46b each have a smaller area than the second irradiation region 46c. The heating time in the second irradiating step thus can be shorter than that in the third irradiating step. Namely, the heating time in the third irradiating step can be longer than that in the second irradiating step.

Second, the first adhesives 30a and 30b are presumed to differ in the type from the second adhesive 30c in the thermosetting adhesive 30. The curing temperature differs when the different types of the thermosetting adhesives are used. The laser output of the laser heating device 40 is then adjusted so that the heating temperature of the first adhesives 30a and 30b in the second irradiating step and the heating temperature of the second adhesive 30c in the third irradiating step are each set to a temperature corresponding to the type of the thermosetting adhesive 30 to be cured. The second irradiating step and the third irradiating step in this case do not necessarily differ in the heating time. The thermosetting adhesive having relatively low adhesion sufficient to ensure the provisional bonding can be used particularly as the first adhesives 30a and 30b in the second irradiating step. The thermosetting adhesive having higher adhesion than the first adhesives 30a and 30b is used as the second adhesive 30c in the third irradiating step so as to ensure the main bonding.

Figure 6A:
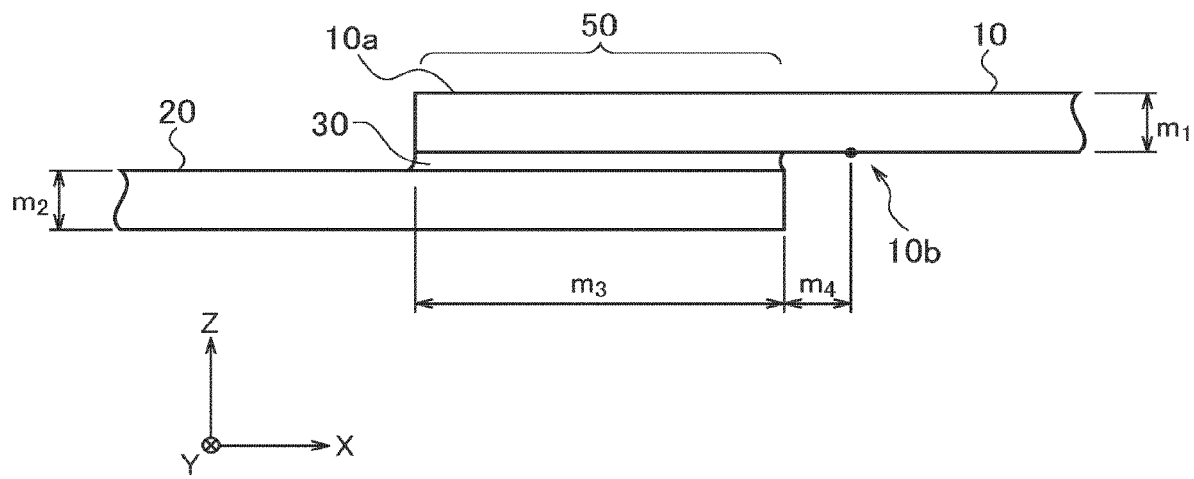
FIG. 6A is a side view illustrating a joined body used as a test member for a test on tensile and shear bond strength.
Figure 6B:
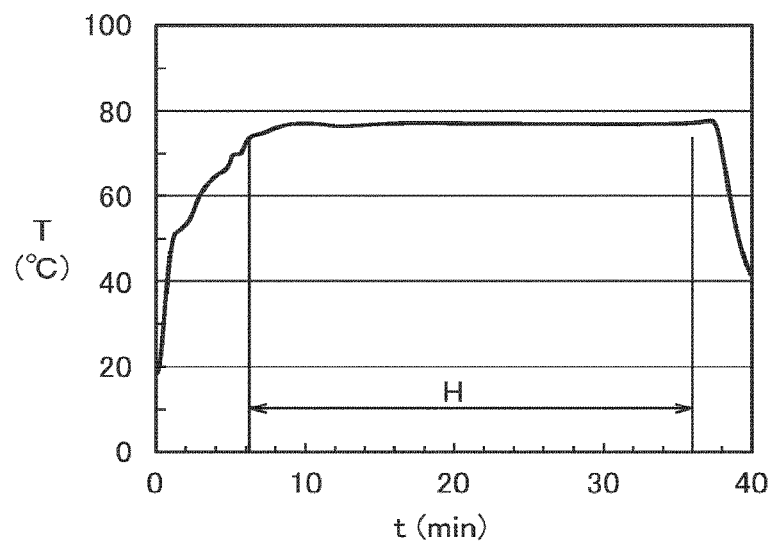
FIG. 6B is a graph showing a temperature on a joined surface at a joined part with respect to a laser irradiation time in the test on the tensile and shear bond strength.

Next, the effectiveness of the joint between the metal member 10 and the composite material member 20 due to the thermosetting adhesive 30 indirectly heated by the laser irradiation is described below. FIG. 6A and FIG. 6B are views for explaining the conditions for a test on tensile and shear bond strength executed for the joined body of the metal member 10 and the composite material member 20.

FIG. 6A is a side view illustrating the joined body as a test member. The material used for the metal member 10 is carbon steel (SS400: the Japanese Industrial Standards). The metal member 10 has the dimensions with a length of 100 mm, a width of 25 mm, and a thickness $m_1$ of 3.2 mm. The material used for the composite material member 20 is carbon fiber reinforced plastics (CFRP). The composite material member 20 has the dimensions with a length of 100 mm, a width of 25 mm, and a thickness $m_2$ of 3.4 mm. A length $m_3$ of the joined part 50 in the tensile direction is 25 mm. A thermocouple 10b is arranged at a position in a part of the metal member 10 used as a temperature measurement position separated by a distance $m_4$ from the edge of the joined part 50 on the composite material member 20 side so as to measure a temperature on the joined surface that is presumed to be the temperature of the thermosetting adhesive 30. The distance $m_4$ is 5 mm. A semiconductor laser with a wavelength of 880 mm is used to irradiate the surface 10a of the metal member 10.

FIG. 6B is a graph showing a temperature T (° C.) on the joined surface of the joined part 50 measured with the thermocouple 10b with respect to a laser irradiation time t (min). The graph indicates a heating time H upon the laser irradiation.

Figure 7:
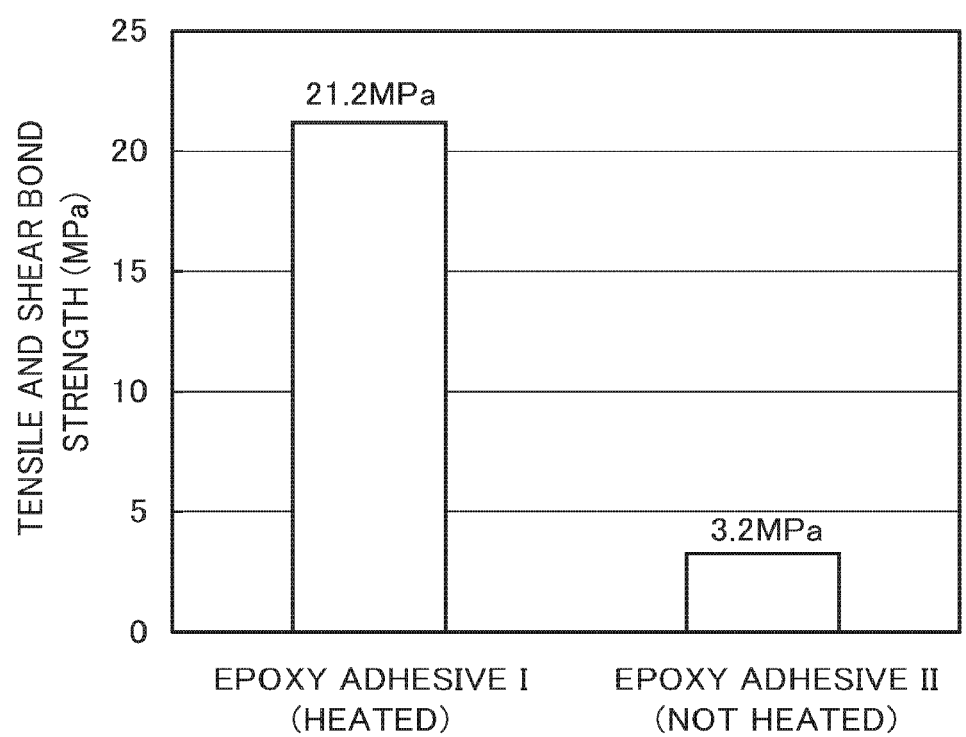
FIG. 7 is a graph showing results of the test on the tensile and shear bond strength.

FIG. 7 is a graph showing the results of the test on the tensile and shear bond strength. The test was executed under the two different conditions, the first test conditions corresponding to the present embodiment and the second test conditions as a comparative example.

As the first test conditions, a two-part epoxy adhesive I was used as the thermosetting adhesive 30. The thermosetting adhesive 30 to be used is one type and is applied to the entire joined surface of the joined part 50, since the test is executed for confirming the effectiveness of the thermosetting adhesive 30 when indirectly heated by the laser irradiation. The presumed temperature on the joined surface was set to 80° C. to 100° C. The heating time was set to 30 minutes. The tensile and shear bond strength thus obtained was 21.2 MPa.

As the second test conditions, a two-part epoxy adhesive II was used as the thermosetting adhesive 30. The two-part epoxy adhesive II has a lower degree of crosslinking than the two-part epoxy adhesive I used as the first test conditions. The thermosetting adhesive 30 to be used in this test is also one type, and is applied to the entire joined surface of the joined part 50. This test did not apply the heat by the laser irradiation made in the present embodiment, while the thermosetting adhesive 30 was hardened simply by normal temperature curing for more than two months. The tensile and shear bond strength thus obtained was 3.2 MPa.

The results revealed that, according to the comparison between the two test conditions, the thermosetting adhesive 30 indirectly heated by the laser irradiation so as to be cured can ensure the high tensile and shear bond strength. It is thus effective to use the metal-resin joining method according to the present embodiment for the joint between the metal member 10 and the composite material member 20. The respective irradiating steps described above included in the metal-resin joining method according to the present embodiment, when heating the thermosetting resin 30 by the laser irradiation, particularly preferably manage the heating time H upon the laser irradiation and the temperature of the thermosetting adhesive 30 when heated. The temperature of the thermosetting adhesive 30 can be calculated with reference to the temperature T (° C.) on the joined surface of the joined part 50 measured with the thermocouple 10*b*, as illustrated above.

The effects of the present embodiment are described below.

The metal-resin joining method according to the present embodiment first joins the metal member 10 to the composite material member 20 formed from the fiber reinforced plastic composite material. The metal-resin joining method includes the applying step of applying the first adhesives 30*a* and 30*b* of the thermosetting adhesive to the first regions 50*a* and 50*b* between the metal member 10 and the composite material member 20. The applying step also applies the second adhesive 30*c* of the thermosetting adhesive to the second region 50*c* between the metal member 10 and the composite material member 20. The metal-resin joining method further includes the provisional bonding step of irradiating, with the laser lights 41*a* and 41*b*, the first irradiation regions 46*a* and 46*b* of the metal member 10 opposed to the first regions 50*a* and 50*b*, and heating and curing the first adhesives 30*a* and 30*b* so as to provisionally bond the metal member 10 and the composite material member 20 together. The metal-resin joining method further includes the main bonding step of curing the second adhesive 30*c* so as to bond the metal member 10 and the composite material member 20 together after the provisional bonding step.

When either the metal member 10 or the composite material member 20 has a large size, for example, the metal member 10 and the composite material member 20 tend to be joined together without an accurate alignment therebetween at an intended joined position at the first try. The present embodiment in this case can easily separate the metal member 10 from the composite material member 20 temporarily in the provisional bonding step, and again align the metal member 10 with the composite material member 20 at the intended joined position, so as to join the respective members together in the following main bonding step. The present embodiment, which uses the thermosetting adhesive 30 for joining the metal member 10 to the composite material member 20, particularly has the advantage of enabling the separation or the stacking between the respective members at normal temperature. The provisional bonding step cures only part of the thermosetting adhesive 30, and thus can separate the respective members from each other more easily. In addition, the present embodiment can eliminate the use of a heating furnace since the thermosetting adhesive 30 is heated by the irradiation with the laser lights 41*a*, 41*b*, and 41*c*, so as to be applicable to any case with no restriction by the dimensions regardless of whether the metal member 10 and the composite material member 20 have a large size.

Setting the first regions 50*a* and 50*b* used as bonding regions in the provisional bonding step to have a narrower area than the second region 50*c* used as a bonding region in the main bonding step can lead to the quick provisional bonding. This enables the effective execution of joint regardless of the bonding method in the main bonding step if the alignment including the separating step does not need to be executed in the provisional bonding step.

As described above, the present embodiment can provide the metal-resin joining method having the advantage of facilitating the joint between the metal member 10 and the composite material member 20.

The metal-resin joining method according to the present embodiment also includes the temporary bonding step of irradiating the irradiation region with the laser light 41 before the provisional bonding step, and heating and curing the first adhesives 30*a* and 30*b* or the second adhesive 30*c* so as to temporarily bond the metal member 10 and the composite material member 20 together. The term "irradiation region" as used herein corresponds to the respective first irradiation regions 46*a* and 46*b* or the second irradiation region 46*c*, or may refer to a part of the respective regions. The provisional bonding step separates the metal member 10 from the composite material member 20 when the joined position therebetween is displaced after the temporary bonding step, and provisionally bonds the metal member 10 and the composite material member 20 together after the alignment of these members.

The metal-resin joining method according to the present embodiment uses the method similar to the provisional bonding step at the point of executing the temporary bonding step that joins the metal member 10 to the composite material member 20 first, so as to further facilitate the process of joining the metal member 10 and the composite material member 20 together.

The metal-resin joining method according to the present embodiment includes the main bonding step that irradiates, with the laser light 41*c*, the second irradiation region 46*c* of the metal member 10 opposed to the second region 50*c* so as to heat and cure the second adhesive 30*c*.

The metal-resin joining method according to the present embodiment uses the similar method in the respective steps from the temporary bonding step to the main bonding step, so as to further facilitate the process of joining the metal member 10 and the composite material member 20 together.

The metal-resin joining method according to the present embodiment includes the provisional bonding step and the main bonding step that differ from each other in at least one of the type, the heating temperature, and the heating time of the first adhesives 30*a* and 30*b* and the second adhesive 30*c*.

The metal-resin joining method according to the present embodiment can adjust the operating state as appropriate so as to further facilitate the separation between the metal member 10 and the composite material member 20 particularly in the provisional bonding step.

The metal-resin joining method according to the present embodiment uses the different heating times between the first adhesives 30a and 30b and the second adhesive 30c when the first adhesives 30a and 30b and the second adhesive 30c to be used are the same type. Alternatively, the metal-resin joining method uses the different heating temperatures between the first adhesives 30a and 30b and the second adhesive 30c when the first adhesives 30a and 30b and the second adhesive 30c to be used are different types.

The metal-resin joining method according to the present embodiment varies the respective conditions as appropriate, so as to regulate the joint time or the curing time appropriately depending on the properties of the thermosetting adhesive 30 used as the first adhesives 30a and 30b or the second adhesive 30c.

The metal-resin joining method according to the present embodiment can use the normal temperature curing for the second adhesive 30c, so as to harden the second adhesive 30c by the normal temperature curing in the main bonding step.

The metal-resin joining method according to the present embodiment does not necessarily apply, to the main bonding step, the curing method common to the respective steps from the temporary bonding step to the provisional bonding step, but can vary the method depending on the characteristics of the thermosetting adhesive 30. The metal-resin joining method does not need to use the laser heating device 40 in the main bonding step particularly when the time to completely harden the adhesive by the normal temperature curing is within an allowable range.

The metal-resin joining method according to the present embodiment separates the metal member 10 from the composite material member 20 in the main bonding step when the bonded position between the metal member 10 and the composite material member 20 is displaced after the provisional bonding step, and then executes the main bonding after the completion of the alignment therebetween.

The metal-resin joining method according to the present embodiment can repeat the alignment as appropriate, so as to join the metal member 10 and the composite material member 20 together with a higher accuracy.

The metal-resin joining method according to the present embodiment defines the first regions 50a and 50b and the second region 50c on the joined surface between the metal member 10 and the composite material member 20 in accordance with the degree of the shear stress S applied in the direction parallel to the joined surface.

The metal-resin joining method according to the present embodiment can define the more effective regions particularly for the first regions 50a and 50b used upon the provisional binding.

The present embodiment has been illustrated above with the case of dividing the joined part 50 into the three regions, the first regions 50a and 50b and the second region 50c, and applying the first adhesive 30a and the like thereto so as to conform to the shape of the respective regions. The present disclosure is, however, not intended to limit the applied state of the thermosetting adhesive 30 to the case illustrated above.

Figure 8A:
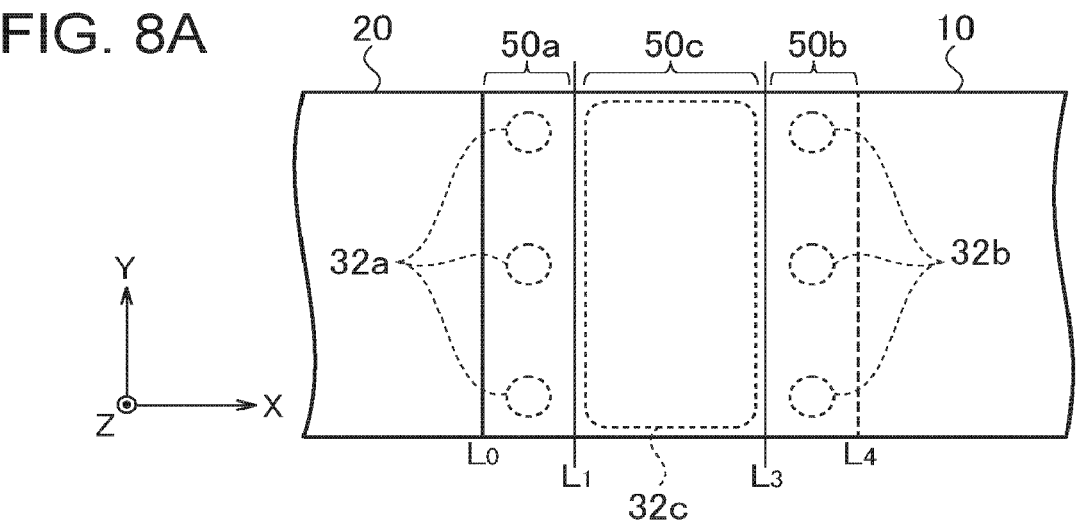
FIG. 8A is a view showing a first example of an applied state of a thermosetting adhesive according to another embodiment.
Figure 8B:
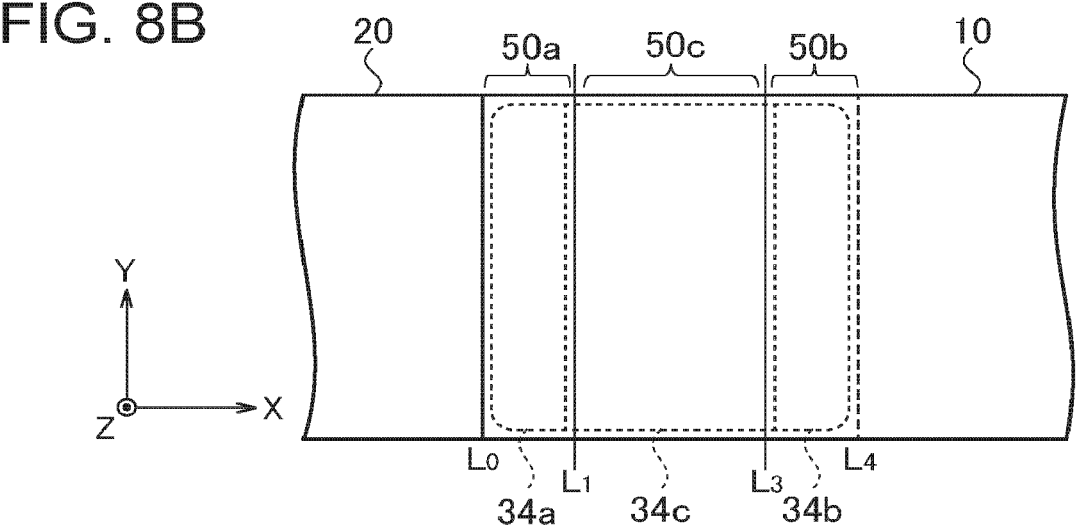
FIG. 8B is a view showing a second example of the applied state of the thermosetting adhesive according to the other embodiment.
Figure 8C:
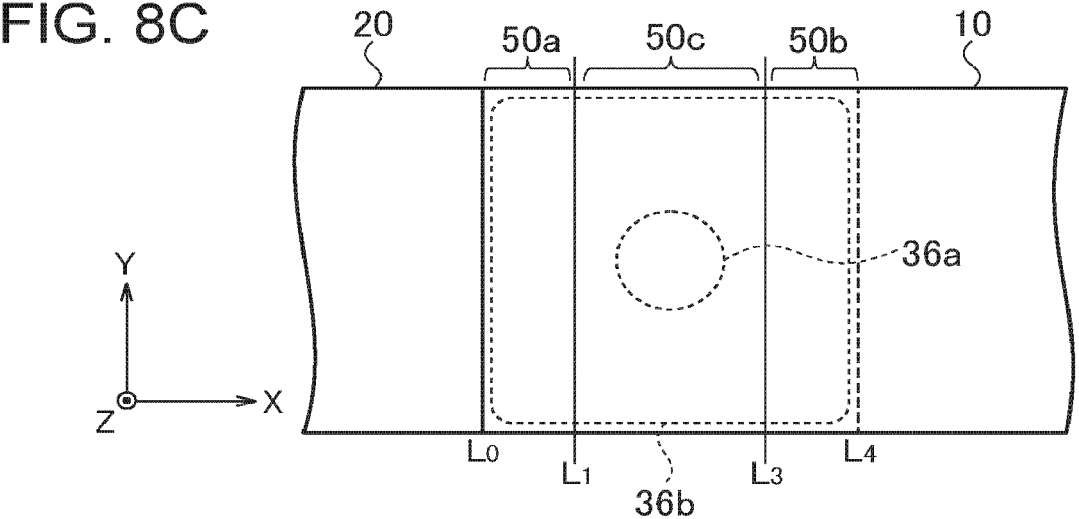
FIG. 8C is a view showing a third example of the applied state of the thermosetting adhesive according to the other embodiment.

FIG. 8A to FIG. 8C are plan views each illustrating the applied state of the thermosetting adhesive according to another embodiment. FIG. 8A to FIG. 8C are the illustrations based on the lower-level view in FIG. 2.

FIG. 8A is a view showing a first example of the applied state of the thermosetting adhesive according to the other embodiment. For example, the first adhesives 32a and 32b may be applied to the first regions 50a and 50b in a spot state at appropriate positions within the respective regions, instead of being applied to the entire surfaces of the first regions 50a and 50b. The second adhesive 32c is applied to the entire surface of the second region 50c, as in the case of the second adhesive 30c illustrated above. The thermosetting adhesive 32 applied to the first regions 50a and 50b is mainly used for the provisional bonding at the initial stage. The application of the first adhesives 32a and 32b in the spot state is thus effective for reducing the bonded areas so as to easily execute the separation in the separating step, for example, to facilitate the alignment between the metal member 10 and the composite material member 20 accordingly. While FIG. 8A illustrates the case in which the first adhesives 32a and 32b are applied to the three optional positions in the respective regions, the respective first adhesives 32a and 32b may be applied to several positions other than three, or may be applied to one position.

FIG. 8B is a view showing a second example of the applied state of the thermosetting adhesive according to the other embodiment. For example, the first adhesives 34a and 34b and the second adhesive 34c applied to the first regions 50a and 50b and the second region 50c may be applied integrally, instead of being applied independently. As described above as the bonding conditions in the respective irradiating steps, both the first adhesives 34a and 34b and the second adhesive 34 to be used can be the same type. The respective adhesives in this case are not necessarily independently applied to the corresponding regions, so as to facilitate the application in the applying step. The respective adhesives are finally integrated together at the point of the completion of the main bonding, regardless of whether the first adhesives 34a and 34b and the second adhesive 34c used as the thermosetting adhesive differ in type. The first adhesive 34a and the second adhesive 34c or the first adhesive 34b and the second adhesive 34c thus may be brought into contact with each other so as to be integrated together at the point before the curing, namely, at the point of the applying step, for example.

FIG. 8C is a view showing a third example of the applied state of the thermosetting adhesive according to the other embodiment. The first regions 50a and 50b and the second region 50c are defined in accordance with the distribution of the shear stress S in the tensile direction as described with reference to FIG. 2. When the occurrence of the large displaced amount G is not easily presumed for the reason that the metal member 10 or the composite material member 20 has a relatively small size, for example, the distribution of the shear stress S is not necessarily taken into consideration. In such a case, the first adhesive 36a may be applied in a spot state only in the middle region of the joined part 50, and the second adhesive 36b may be applied to the entire region of the joined part 50 other than the middle region, for example. The first adhesive 36a is the thermosetting adhesive to be used in the provisional bonding step, while the second adhesive 36b is the thermosetting adhesive to be used in the main bonding step.

While the respective embodiments have been illustrated above with the case in which the metal member 10 and the composite material member 20 used as a joined target are each a flat plate member, the respective members may each have a complex shape.

While the present disclosure has been illustrated above with the intended embodiments, it should be understood that the present disclosure is not intended to be limited to these embodiments, and various modifications and changes can be made within the scope of the disclosure.

REFERENCE SIGNS LIST

10 METAL MEMBER
20 COMPOSITE MATERIAL MEMBER
30 THERMOSETTING ADHESIVE
30a, 30b FIRST ADHESIVE
30c SECOND ADHESIVE
41a, 41b, 41c LASER LIGHT
46a, 46b FIRST IRRADIATION REGION
46c SECOND IRRADIATION REGION
50a, 50b FIRST REGION
50c SECOND REGION

What is claimed is:

1. A metal-resin joining method of joining a metal member to a composite material member including a fiber reinforced plastic composite material, the method comprising:
an applying step of applying a first adhesive that is a thermosetting adhesive to a first region between the metal member and the composite material member, and applying a second adhesive that is a thermosetting adhesive to a second region between the metal member and the composite material member;
a provisional bonding step of irradiating a first irradiation region of the metal member opposed to the first region with a laser light, and heating and curing the first adhesive to provisionally bond the metal member and the composite material member together; and
a main bonding step of curing the second adhesive to bond the metal member and the composite material member together after the provisional bonding step.

2. The metal-resin joining method according to claim 1, further comprising a temporary bonding step of irradiating the first irradiation region or a second irradiation region of the metal member opposed to the second region with the laser light, and heating and curing the first adhesive or the second adhesive to temporarily bond the metal member and the composite material member together before the provisional bonding step,
wherein the provisional bonding step separates the metal member from the composite material member when a joined position between the metal member and the composite material member is displaced after the temporary bonding step, and executes provisional bonding after aligning the respective members with each other.

3. The metal-resin joining method according to claim 1, wherein the main bonding step irradiates a second irradiation region opposed to the second region with the laser light, and heats and cures the second adhesive.

4. The metal-resin joining method according to claim 3, wherein the provisional bonding step and the main bonding step differ in at least one of a type, a heating temperature, and a heating time of the first adhesive and the second adhesive.

5. The metal-resin joining method according to claim 4, wherein the first adhesive differs in the heating time from the second adhesive when the first adhesive and the second adhesive are the same type.

6. The metal-resin joining method according to claim 4, wherein the first adhesive differs in the heating temperature from the second adhesive when the first adhesive differs in the type from the second adhesive.

7. The metal-resin joining method according to claim 1, wherein:
the second adhesive can be cured by normal temperature curing; and
the main bonding step cures the second adhesive by the normal temperature curing.

8. The metal-resin joining method according to claim 1, wherein the main bonding step separates the metal member from the composite material member when a joined position between the metal member and the composite material member is displaced after the provisional bonding step, and executes main bonding after aligning the respective members with each other.

* * * * *